(12) United States Patent
Przybysz et al.

(10) Patent No.: US 8,641,085 B2
(45) Date of Patent: Feb. 4, 2014

(54) AIRBAG COMPRISING AT LEAST A FIRST SIDEWALL AND A SECOND SIDEWALL AND AT LEAST ONE RETAINING STRAP

(75) Inventors: Lukasz Przybysz, Wroclaw (PL); Jacek Wozniczek, Wroclaw (PL); Dominika Babalska, Porzydowo (PL); Marzena Adamska, Olawa (PL)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 13/642,680

(22) PCT Filed: Mar. 16, 2011

(86) PCT No.: PCT/EP2011/001308
§ 371 (c)(1),
(2), (4) Date: Dec. 28, 2012

(87) PCT Pub. No.: WO2011/131275
PCT Pub. Date: Oct. 27, 2011

(65) Prior Publication Data
US 2013/0093168 A1   Apr. 18, 2013

(30) Foreign Application Priority Data
Apr. 22, 2010   (DE) .......................... 10 2010 018 180

(51) Int. Cl.
*B60R 21/233*   (2006.01)
*B60R 21/206*   (2011.01)

(52) U.S. Cl.
CPC .............. *B60R 21/233* (2013.01); *B60R 21/206* (2013.01)
USPC ...................... 280/729; 280/730.1; 280/743.2

(58) Field of Classification Search
USPC ..................... 280/729, 730.1, 743.2, 752, 753
See application file for complete search history.

(56) References Cited

U.S. PATENT DOCUMENTS 5,647,609 A   7/1997   Spencer et al.
5,975,564 A   11/1999   Smith et al.
(Continued)

FOREIGN PATENT DOCUMENTS

DE   10 2005 043 308 A1   3/2007
DE   10 2008 029 655 A1   12/2009
(Continued)

OTHER PUBLICATIONS

Gerardo Mendez; Knee Airbag Module, Oct. 27, 2009, USPTO, U.S. Appl. No. 61/272,729.*

(Continued)

*Primary Examiner* — James English
(74) *Attorney, Agent, or Firm* — Brinks Gilson & Lione (57) ABSTRACT

A motor vehicle passenger restraint airbag with a first side wall and a second side wall which encloses a gas-filled compartment and at least one catch strap which extends through the gas-filled compartment from the first side wall to the second side wall. In order to facilitate production, each side wall has at least two sections connected to each other, whereby each of the sections is part of a one-piece blank each of which has two sections of which a first section is a section of the first wall and a second section is a section of the second side wall. At least one of the blanks has a third section which connects the first and second section to each other and which forms the catch strap.

16 Claims, 5 Drawing Sheets

(56) References Cited

U.S. PATENT DOCUMENTS

| | | | |
|---|---|---|---|
| 6,450,529 B1* | 9/2002 | Kalandek et al. | 280/730.2 |
| 6,685,217 B2* | 2/2004 | Abe | 280/730.1 |
| 7,207,594 B2* | 4/2007 | Igawa et al. | 280/730.1 |
| 7,513,523 B2* | 4/2009 | Bayley et al. | 280/730.2 |
| 7,748,730 B2* | 7/2010 | Kashiwagi | 280/728.2 |
| 7,891,700 B2* | 2/2011 | Ishida | 280/730.1 |
| 8,393,638 B2* | 3/2013 | Gottschalk et al. | 280/730.1 |
| 8,430,422 B2* | 4/2013 | Wehner et al. | 280/730.1 |
| 2006/0071458 A1 | 4/2006 | Sendelbach et al. | |
| 2006/0108780 A1* | 5/2006 | Hotta et al. | 280/732 |
| 2007/0246920 A1* | 10/2007 | Abele et al. | 280/730.1 |
| 2009/0085333 A1* | 4/2009 | Imaeda et al. | 280/730.1 |
| 2010/0096841 A1* | 4/2010 | Tanaka et al. | 280/730.1 |
| 2011/0095512 A1* | 4/2011 | Mendez | 280/730.1 |

FOREIGN PATENT DOCUMENTS

| | | |
|---|---|---|
| EP | 0 865 973 A1 | 9/1998 |
| WO | WO 2008/047599 A1 | 4/2008 |

OTHER PUBLICATIONS

PCT International Search Report—Jul. 12, 2011.

* cited by examiner

AIRBAG COMPRISING AT LEAST A FIRST SIDEWALL AND A SECOND SIDEWALL AND AT LEAST ONE RETAINING STRAP

CROSS-REFERENCE TO RELATED APPLICATIONS

This application claims priority to European Application No. 2011001308, filed Apr. 22, 2010 and PCT EP2011/001308, filed Mar. 16, 2011.

TECHNICAL FIELD OF THE INVENTION

This invention relates to an airbag for a motor vehicle passenger restraint system with a first side wall and a second side wall which encloses a gas-filled compartment and at least one catch strap which extends through the gas-filled compartment from the first side wall to the side wall.

BACKGROUND OF THE INVENTION

In automobile technology one can basically differentiate between two basic types of airbags:

On the one hand, there are airbags with a relatively great depth that are basically constructed "like pillows." Included in these airbags in particular are the front airbags for the driver and the passenger, the so-called driver airbags and passenger airbags.

Other types of airbags include airbags whose thickness in relation to the surface of the airbag cover is relatively small and which are constructed in a laminar manner, so that one can speak of two side walls which basically extend parallel to each other. These airbags in particular include curtain airbags, side airbags, and knee airbags. In order to achieve the desired shape, namely a relatively small thickness with a relatively large area, the side walls of the airbag in this type of airbags are as a rule not only connected to each other on the edge but also at other points. In curtain airbags and side airbags the connection frequently occurs directly between the side walls; so-called catch straps are frequently provided for knee airbags.

The last-mentioned type of airbag, namely airbags with two side walls and at least one catch strap which extends through the gas-filled compartment from a first side wall to a second side wall, is usually built as follows: the two side walls belong either to different blanks of material or to a common blank and that at least one catch strap is a separate blank which is connected to the two side walls, usually by stitching. As a rule, there are several catch straps. The manufacturing expense is, as a rule, relatively high. Furthermore, relatively high forces act on the connection areas between the side walls and the at least one catch strap, so that the connections must be designed to be appropriately resistant to failure. The present invention relates to this type of airbag. An airbag of this type is shown, for example, in DE 10 2008 029 655 A1.

Based on the state of the art, the object of the present invention is to further develop an airbag of this type that it is simple and rational to manufacture.

SUMMARY OF THE INVENTION

The inventive airbag needs no separate blank for the catch strap. Instead, each side wall has at least two sections connected to each other, whereby at least each of these sections is a part of a one-piece blank which has two sections, of which a first section is a section of the first side wall and a second section is a section of the second side wall. A third section extends between these two sections which connects the first two sections and forms the catch strap.

The difference between the prior airbags of this type and this airbag consists in that the two side walls are not constructed as one piece and no catch strap made of a separate blank extends between these two side walls, but instead each side wall consists of at least two sections, whereby at least one of these sections is connected as a single piece with the corresponding section of the other side wall. The sections connected with each other as one piece form a blank. A blank is in this case placed on the previously laid blank more or less in a hood-like fashion. Basically, any number of such blanks can be placed on each other.

In addition to a simple mounting and the absence of separate connections (stitchings) between the side walls and the catch straps, there are other advantages: the blank which directly accepts the gas generator and which, as a rule, is exposed to the highest stresses, can be constructed as a standard blank for a variety of different airbags which contributes to a rationalization of the production. It is furthermore possible to produce the blanks from different materials; in particular the blanks which are located away from the gas generator can be manufactured in many cases from a lighter material which leads to a reduction of weight.

Every third section, namely each catch strap, divides the gas-filled compartment into two partial gas-filled compartments which naturally must be connected to each other in relation to the gas flow. According to one preferred embodiment of this invention, this connection between the two partial gas-filled compartments occurs via a side cut in the blank, so that the two side walls remain connected to each other in the middle part. There is a very good unfolding behavior, especially with the further features of this invention by means of which symmetrization is achieved.

If the aim is that the airbag in its completely expanded state has a curved, banana-shaped cross-section, one side wall can be shortened with respect to the other side wall. Thus, with a little extra effort an airbag can be produced which follows a curved surface that can be especially advantageous with knee airbags.

This invention also encompasses a method to produce such an airbag having the features described previously.

BRIEF DESCRIPTION OF THE DRAWINGS

The invention will now be described in more detail using exemplary embodiments with reference to figures.

DESCRIPTION OF PREFERRED EMBODIMENTS

Figure 1:
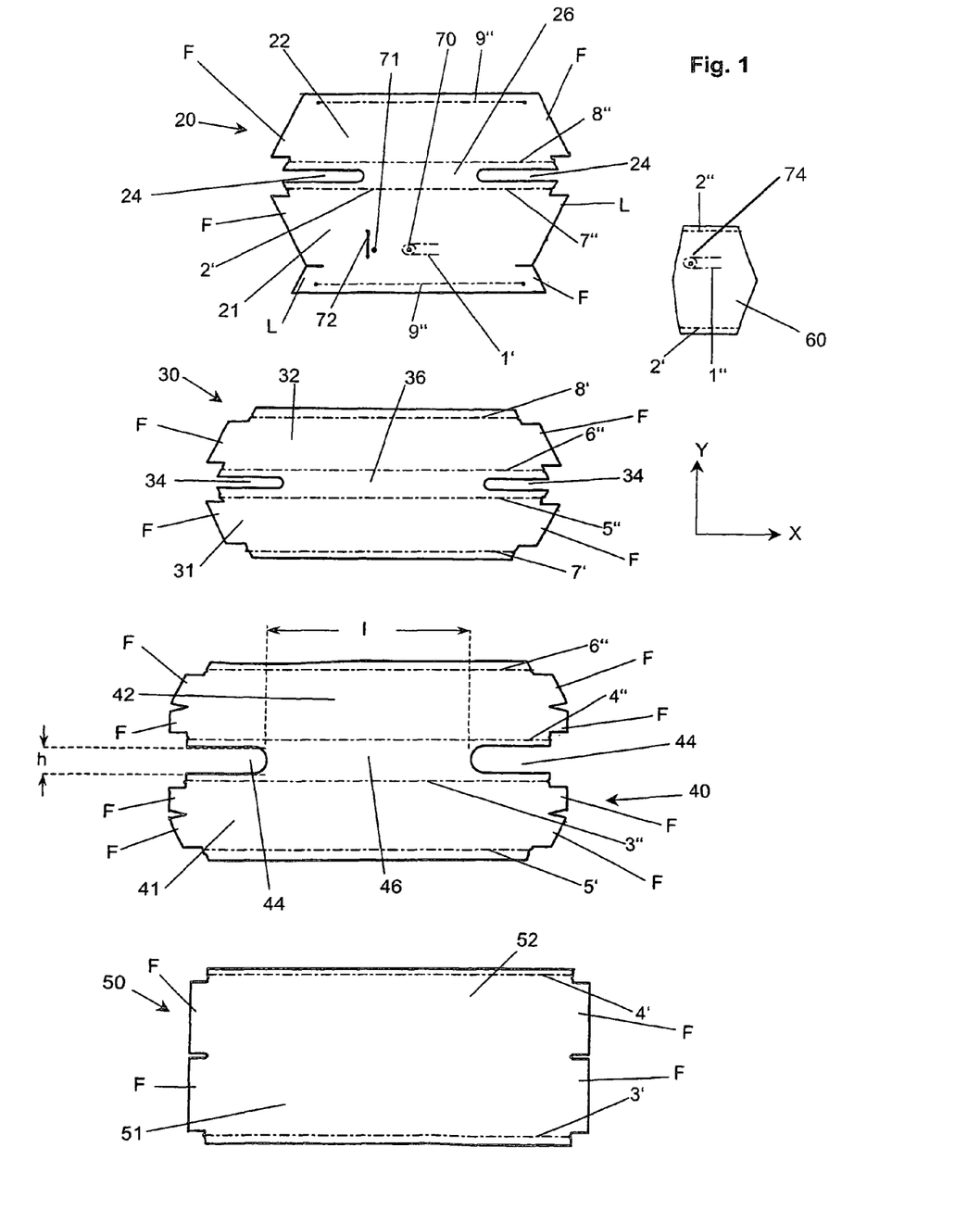
FIG. 1 shows the components parts of an embodiment of the inventive airbag.

FIG. 1 shows the component parts of the inventive airbag, namely its fabric blanks, exactly five pieces in the shown exemplary embodiment. The first four blanks 20, 30, 40 and 50 form the airbag cover, whereby the first three blanks 20, 30, 40 also form the catch straps. The deflector blank 60 is used to distribute the gas coming from the gas generator 92 (not depicted in FIG. 1) and reduce the stress on the first blank 20, as will be seen more exactly later.

The first three blanks 20, 30, 40 are all basically formed similarly, they namely have a first section 21, 31, 41, a second section 22, 32, 42, and a third section 26, 36, 46, respectively. Third sections 26, 36, 46 form catch straps. Indentations 24, 34, 44 extend from the sides into the first three blanks, whereby the indentations 24, 34, 44 point to each other and whereby the three sections 26, 36, 46 each lie between the indentations 24, 34, 44. Thus, the first three blanks 20, 30, 40, have the structure of a double-T. It is apparent from FIG. 1, especially with reference to the depiction of the third blank 40, that the three sections are basically a rectangle with a height and a length. The third section 46 of the third blank has the height h, and the length l.

The area of the third section 46 typically is less than 20% of the area of its associated blank and typically has 3 to 12% of the area of a side wall of the finished airbag. It is furthermore typical that the height of a third section 46, i.e., the length of the catch strap resulting therefrom, is very much smaller than the length, L, of the airbag (see FIG. 4).

The fourth blank 50 has no slits, as is apparent from FIG. 1.

One can further see in FIG. 1 that the first, second, third and fourth blanks 20, 30, 40, and 50 have a symmetrical axis which is parallel to the Y-direction. The second blank 30, third blank 40 and fourth blank 50 also have a symmetrical axis which is parallel to the X-direction.

As FIG. 1 shows, the four blanks 20, 30, 40 and 50 each feature side flaps which are all designated with F.

The position of the stitchings is shown in FIG. 1 with dot-dashed lines. Here 1' and 1" designate the position of the later first stitching, reference numerals 2' and 2" designate the position of the later second stitching, and so on. That means that the lines with the same numbers will later lie on each other when assembling the airbag.

The first blank 20 has a slit 72 to insert the gas generator 92 and two pass-through openings 70, 71 to introduce gas generator bolts. The deflector blank 60 likewise has a pass-through opening, designated here with 74, which, as one will see in the assembled condition, is congruent with the first pass-through opening 70 of the first blank 20.

Figure 2:
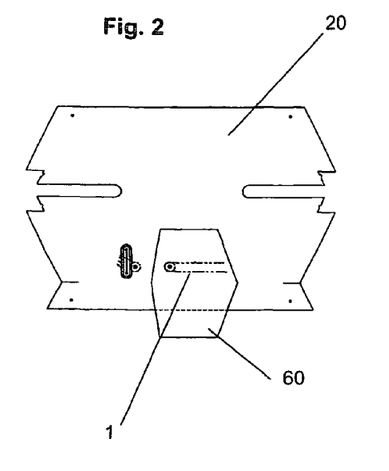
FIG. 2 shows two blanks from FIG. 1 after a first assembly step.
Figure 3:
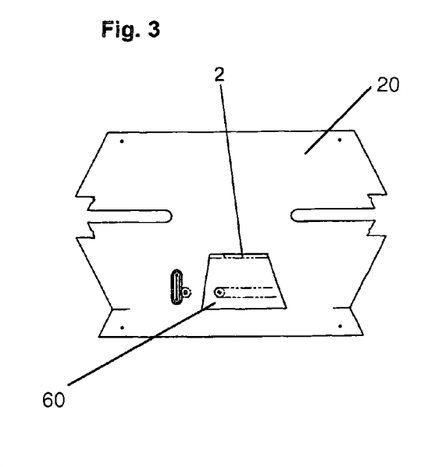
FIG. 3 shows the depiction in FIG. 2 after a second assembly step.

FIG. 2 shows the first assembly step. In it, the deflector blank 60 is secured on the first blank 20, namely sewn by means of the first stitching 1. In the second assembly step, as shown in FIG. 3, the deflector element 60 is sewn to itself with the second stitching 2 so that a tube is formed.

Subsequently, the four blanks 20, 30, 40 50 are connected to each other by means of the stitchings 3 to 8, whereby the stitchings are arranged in this sequence, i.e. starting at 3. Next the fourth blank 50 is sewn onto the third blank 40, whereby the lines 3' come to lie on the line 3" and the line 4' on the line 4". Following the same pattern, the third blank 40 is then sewn onto the second blank 30 and the second blank 30 onto the first blank 20. Finally, the first blank 20 is sewn to itself along the lines 9' and 9", whereby this stitching 9 forms a shear stitching which requires the use of a sewing machine with a long arm.

After completion of the described sewing processes the flaps F used as a stitching reinforcement are folded inward and arranged on the stitchings 10, 11 closing the airbag. It should be noted that the position of the stitching 9 is shown in FIG. 4, although it cannot be seen in the selected overhead view.

Figure 4:
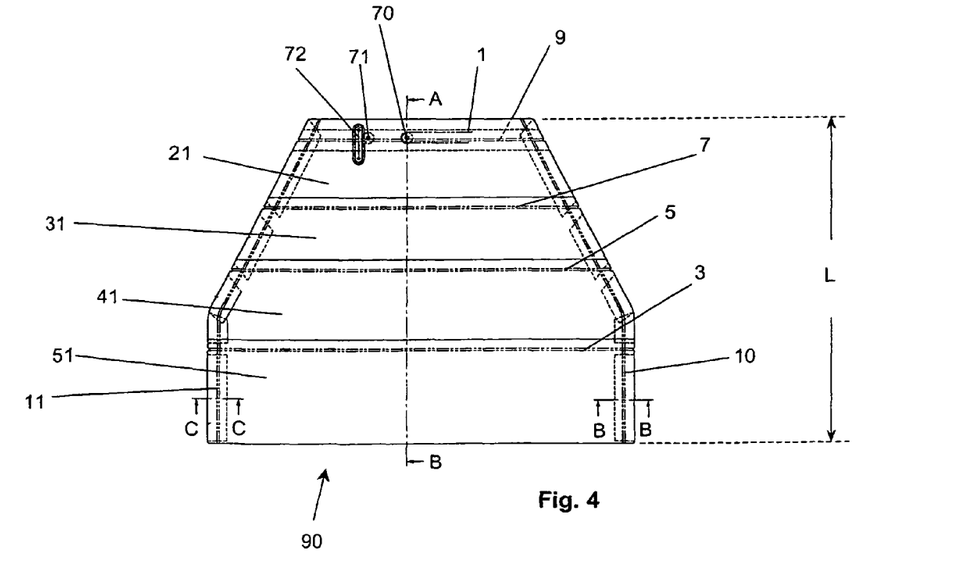
FIG. 4 is an overhead view of a completely assembled airbag.
Figure 5:
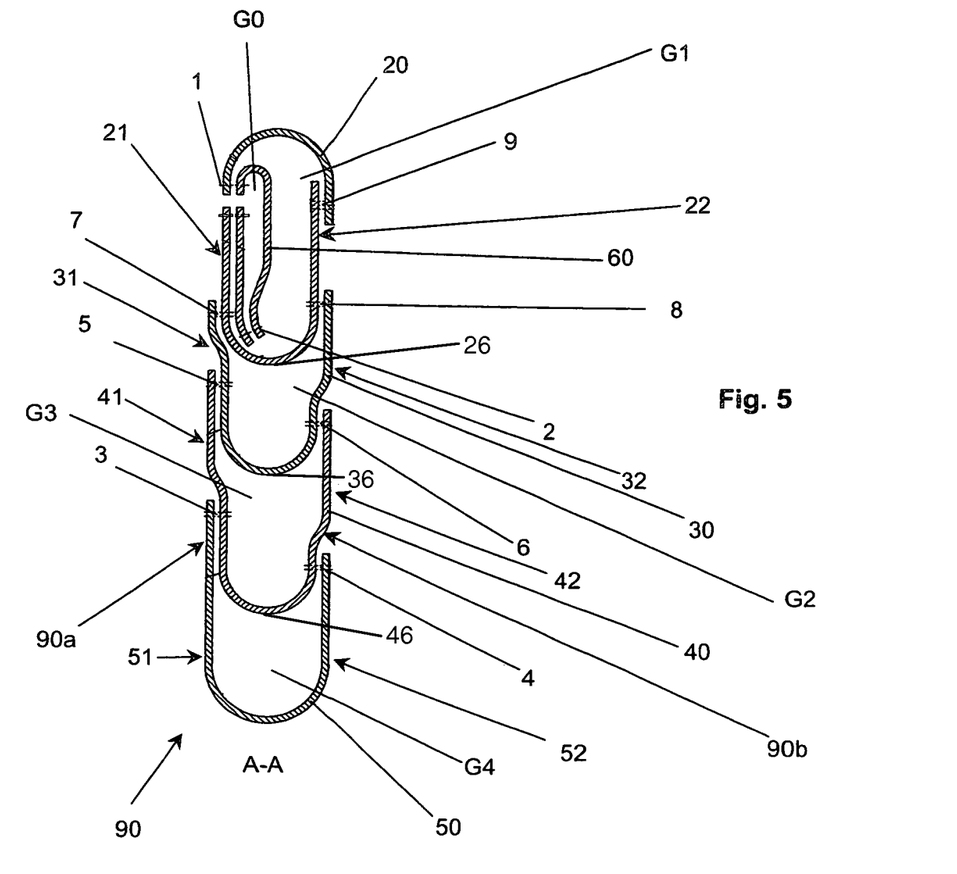
FIG. 5 shows a cut along the plane A-A in FIG. 4.

FIG. 5 shows a cut along the plane A-A from FIG. 4. Here one can again well recognize the structure of the inventive airbag, namely that the airbag is composed of overlaid blanks. One sees in FIG. 5 that the gas-filled compartment is divided into four partial gas-filled compartments G1-G4, whereby the distribution gas-filled compartment G0 encloses the deflector blank 60 in the first gas-filled compartment. One can also immediately see in FIG. 5 that owing to the structure of the airbag, relatively low forces act on the stitchings 1-9, since there is no "pulling" from them to the extent as was the case with prior airbags in which the catch straps are sewn into the interior of an airbag cover. The gas passage from one partial gas-filled compartment into the next occurs by means of slits 24, 34 and 44.

Figure 6:
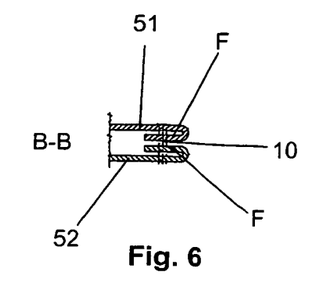
FIG. 6 shows a cut along the plane B-B in FIG. 4.
Figure 7:
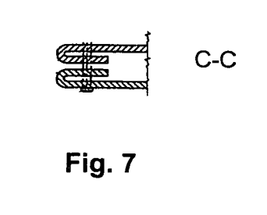
FIG. 7 shows a second exemplary embodiment of an inventive airbag in a depiction corresponding to FIG. 4 before the last assembly step.
Figure 8:
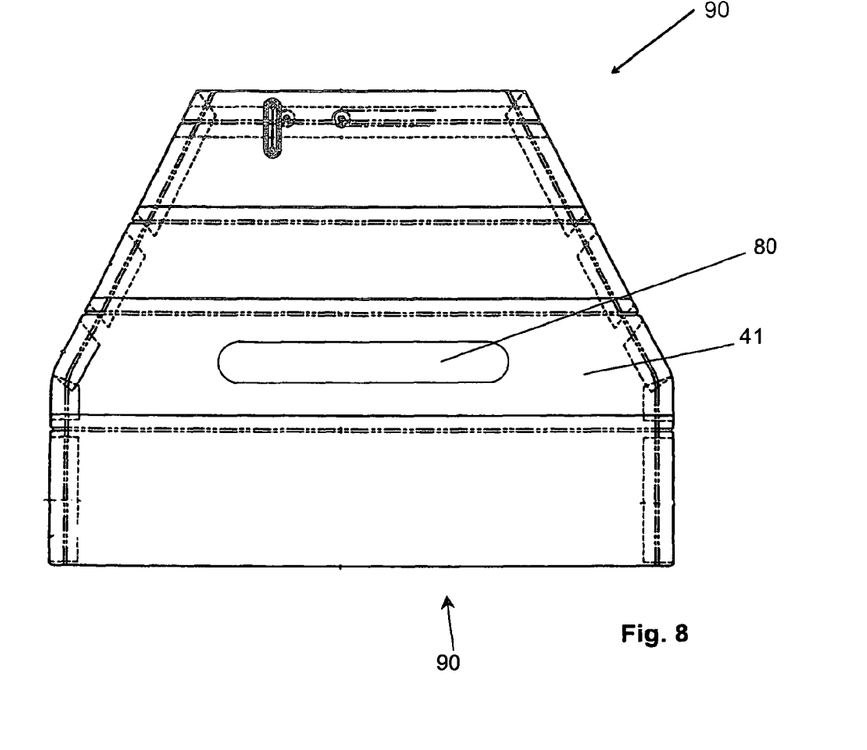
FIG. 8 shows a cut along the plane C-C in FIG. 4.
Figure 9:
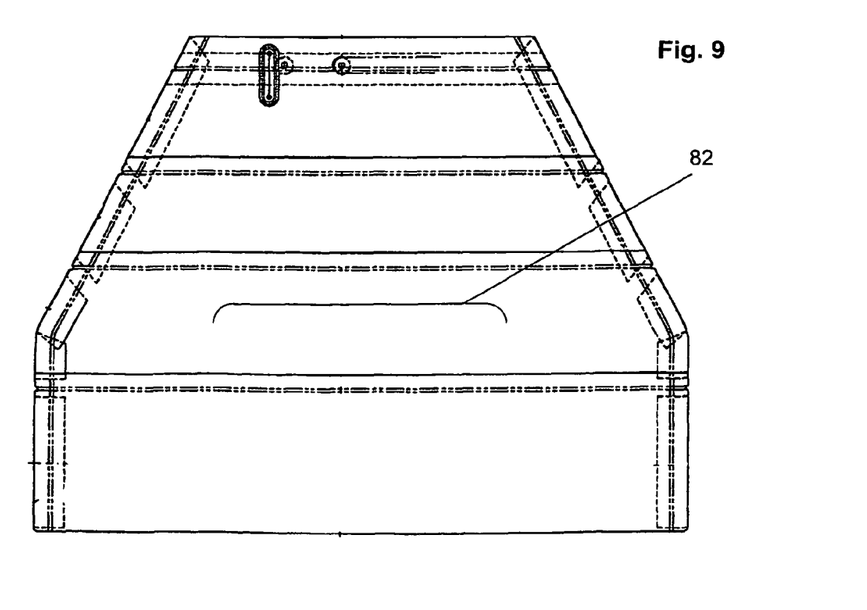
FIG. 9 shows the depiction in FIG. 8 after completion of the last assembly step.
Figure 10:
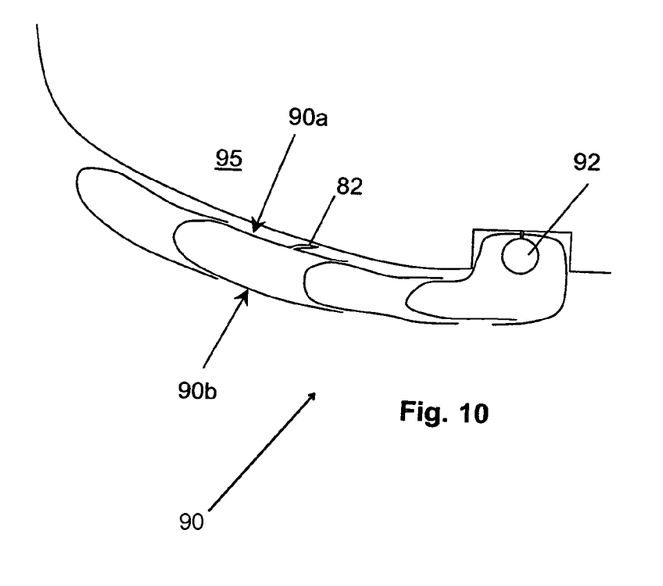
FIG. 10 is a cross-section view through the assembled and completely expanded airbag of FIG. 9.

Owing to the symmetry of the blanks, the two side walls 90a, 90b of the airbag 90 basically extend along planes parallel to each other. It can, however, be requested that the fully expanded airbag has a "banana-shaped" cross-section; that can be desirable in particular with knee airbags. The second exemplary embodiment, which is described with references to FIGS. 8-10, shows how this can be achieved. FIG. 8 shows this airbag 90 in a depiction corresponding to FIG. 4. One sees here, that the first section 41 of the third blank has an opening 80. The opening is basically configured to be long, whereby the longitudinal direction of this opening basically extends perpendicular to the longitudinal direction of the airbag. In one last assembly step, as indicated in FIG. 6, this opening 80 is closed by means of a stitching 82, so that a closed opening 82 results. Thus, the first side wall 90a is shortened with respect to the second side wall 90b, whereby when filled completely, the reaction shown in FIG. 10 occurs, namely that the cross-section of the airbag is banana-shaped to lie against panel 95. Alternatively, it is also possible in at least one blank to select the height of the first section—that means its extension in the Y-direction—to be different from the height of the second section, whereupon the symmetry of the corresponding blank is reduced. With regard to the sewing process to be performed, the first described alternative should, however, be preferred as a rule.

In particular, because of the above-mentioned fact that the connection lines are connected to each other along their adjacent blanks and are only relatively weakly stressed, connections other than stitchings can be used. These types of connections are, in particular, gluing and welding. Such types of connections are advantageous, if all or at least some of the blanks are produced from very light textiles or foil.

While the above description constitutes the preferred embodiment of the present invention, it will be appreciated that the invention is susceptible to modification, variation and change without departing from the proper scope and fair meaning of the accompanying claims.

The invention claimed is:

1. An airbag comprising a first outer side wall and a second outer side wall enclosing a gas volume,
   each of the outer side walls formed from a plurality of one-piece blanks, each of the blanks having a first section comprised of a first end being connected at the first end to one another blank forming the first outer side wall, and each of the blanks having a second section comprised of a second end being connected at the second end to one another forming the second outer side wall wherein at least one of the blanks further forms a third section connecting the first and the second section of one other of the blanks, the third section forming a catch strap extending through the gas volume from the first outer side wall to the second outer side wall.

2. The airbag according to claim 1, further comprising that the blank which forms the third section further forms at least one lateral slot in the third section separating the first section from the second section.

3. The airbag according to claim 2, further comprising that the blank which forms the third section further forms at least two of the lateral slots oriented to be pointing towards each other.

4. The airbag according to claim 1 further comprising that the third section is generally rectangular in outline shape.

5. The airbag according claim 1 further comprising that the area of the third section is about 12% of the area of one of the side walls or less of one of the blanks.

6. The airbag according to claim 1 further comprising that the height of the third section is 15% of the length of one of the side walls or less of one of the blanks.

7. The airbag according to claim 1 further comprising that at least two of the blanks with the third section forming the catch strap are provided.

8. The airbag according claim 1 further comprising that the two side walls are connected to one another by edge connection lines.

9. The airbag according to claim 8, further comprising that the edge connection lines is formed by a continuous seam.

10. The airbag according to claim 8, further comprising that the edge connection lines are separate seams.

11. The airbag according to claim 1 further comprising that one side wall is shortened in respect to the other side wall of at least one of the blanks.

12. The airbag according to claim 11, further comprising that shortening to form the shortened side wall is achieved via a closed opening in the first or the second side wall.

13. The airbag according to claim 1 further comprising that at least two blanks are different from each other in respect of their material.

14. A method for manufacturing an airbag enclosing a gas volume, the method comprising the following steps:
providing a plurality of one-piece blanks each having a first section comprised of a first end and each having a second section comprised of a second end wherein at least one of the blanks further forms a third section connecting the first and the second section of the at least one of the blanks for forming a catch strap,
connecting the first sections of the blanks via first connection lines to form a first outer side wall,
connecting the second sections of the blanks via second connection lines to form a second outer side wall in a manner that the catch strap extends through the gas volume from the first outer side wall to the second outer side wall and from the first section of an adjacent other blank to the second section of the adjacent other blank, and
closing the airbag.

15. The airbag according to claim 1 further comprising a further blank having a pair of flaps, the flaps connected with the first and second sections of one of the one-piece blanks to enclose the gas volume.

16. The airbag according to claim 15 wherein the further blank forms an outer edge of the airbag.

* * * * *

UNITED STATES PATENT AND TRADEMARK OFFICE
CERTIFICATE OF CORRECTION

PATENT NO.        : 8,641,085 B2
APPLICATION NO.   : 13/642680
DATED             : February 4, 2014
INVENTOR(S)       : Lukasz Przybysz et al.

It is certified that error appears in the above-identified patent and that said Letters Patent is hereby corrected as shown below:

In the Claims

Col. 5, In claim 5, line 17, before "side walls", please insert --outer--.

Col. 5, In claim 6, line 20, before "side walls", please insert --outer--.

Col. 5, In claim 8, line 25, after "two", please insert --outer--.

Col. 5, In claim 11, line 32, after "the", please insert --one--.

Col. 6, In claim 12, line 2, after "shortened", please insert --outer--, and in line 3, after "second", please enter --outer--.

Signed and Sealed this
Twentieth Day of May, 2014

Michelle K. Lee
*Deputy Director of the United States Patent and Trademark Office*